(12) United States Patent
Yeh et al.

(10) Patent No.: US 7,154,601 B2
(45) Date of Patent: Dec. 26, 2006

(54) TESTING METHOD FOR A POLARIZING PLATE

(75) Inventors: Shih-Feng Yeh, Taoyuan (TW); Yao-Chung Cheng, Taoyuan (TW)

(73) Assignee: Optimax Technology Corporation, Ping Chen (TW)

( * ) Notice: Subject to any disclaimer, the term of this patent is extended or adjusted under 35 U.S.C. 154(b) by 92 days.

(21) Appl. No.: 10/829,325

(22) Filed: Apr. 22, 2004

(65) Prior Publication Data

US 2005/0237526 A1    Oct. 27, 2005

(51) Int. Cl.
*G01J 4/00*    (2006.01)
(52) U.S. Cl. .................................................. 356/369
(58) Field of Classification Search ................ 356/356, 356/364–370, 428, 411.1, 33–35
See application file for complete search history.

(56) References Cited

U.S. PATENT DOCUMENTS 5,227,623 A * 7/1993 Heffner ...................... 250/225
5,822,063 A * 10/1998 Suzuki et al. ............... 356/364
5,903,353 A * 5/1999 Raymond .................... 356/620
6,147,757 A * 11/2000 Shen et al. .................. 356/364
6,473,180 B1 * 10/2002 Hirosawa .................... 356/364
6,613,433 B1 * 9/2003 Yamamoto et al. ......... 428/411.1
6,633,358 B1 * 10/2003 Kwok et al. ................. 349/136
6,822,737 B1 * 11/2004 Kurata et al. ............... 356/364

* cited by examiner

*Primary Examiner*—Gregory J. Toatley, Jr.
*Assistant Examiner*—Isiaka O. Akanbi
(74) *Attorney, Agent, or Firm*—Alan D. Kamrath; Nikolai & Mersereau, P.A.

(57) ABSTRACT

The testing method for a polarizing plate includes the following two types of testing: a selected light beam passing through a filter, a polarizer, a concave lens and a filter, a mirror, a concave lens and finally to a sample of a polarizing plate; the sample is rotated along z-axis to ascertain that if there is any variation of shade in an optical domain, in order to differentiate defective samples from qualified ones. By applying the method, gooseflesh in the sample is ascertained by naked eyes easily while feeding; the checking result can be reflected to a factory owner. The test cost is low and requires only inexpensive instruments. Moreover, an additional processing of polarizing plate is needless.

5 Claims, 4 Drawing Sheets

TESTING METHOD FOR A POLARIZING PLATE

BACKGROUND OF THE INVENTION

1. Field of the Invention

The present invention is related to a testing method for a polarizing plate. The method includes processes of a selected beam of light passing through a filter, a polarizer, a concave lens or a filter, a mirror, a concave lens and finally to an optical film; the optical film is rotated along z-axis to ascertain that if there is any variation of shade in an optical domain, in order to differentiate defective samples from qualified ones.

2. Description of the Prior Art

In a process of polarizing coatings, a pre-checking is necessary to prevent defects in products while feeding a new material of optical coatings. However, there are some defects, such as gooseflesh in the coating, undetectable by naked eyes. The gooseflesh results from non-uniform thickness of the polarizing coating and are not detected apparently by the naked eyes until the polarizing coating is preprocessing to half-finished, so that increase the production costs.

When an optical coating is preprocessing to half-finished, a check by crossing polarized beams transmitting is necessary to ascertain order of severity of film thickness. It is late to use the checking method because it helps little for costs to differentiate defective samples from qualified ones until the coating is half-finished.

It is also difficult to reflect defects to a factory owner who offers the material of optical coatings. Non-uniformity of the film thickness cannot be reflected to the factory owner immediately because the non-uniformity cannot be detected by naked eyes until the coating is half-finished. Moreover, there is no precise standard for the non-uniformity, which is difficult to describe; as a result, the factory owner has no idea of the defects and improving method.

A motive of the present invention is based on the foregoing; however, to ascertain the non-uniformity and reflect immediately, it should not take too much time to check the defects. The most important is to appear the shortage of non-uniform thickness and the non-uniformity can be detected by the naked eyes and no instrument for checking is needed.

SUMMARY OF THE INVENTION

The present invention relates to a testing method for a polarizing plate and the first objective is to offer a testing method to detect non-uniform thickness of a coating by naked eyes.

The present invention relates to a testing method for a polarizing plate and the second objective is to ascertain that if the thickness is uniform and reflect checking results to a factory owner immediately. The non-uniformity of coatings is ascertained while feeding instead of in half-finished.

The present invention relates to a testing method for a polarizing plate and the third objective is to offer a testing method. The cost is not too much and no expensive instruments need to be set up additionally; moreover, the sample itself can be checked. Therefore, the checking method has a simplified procedure and it does not take much time to finish the checking.

The present invention is related to a testing method for a polarizing plate. The method includes processes of a selected beam of light passing through a filter, a polarizer, a concave lens or a filter, a mirror, a concave lens and finally to an optical coating sample; the optical coating sample is rotated along z-axis to ascertain that if there is any variation of shade in an optical domain, in order to differentiate defective samples from qualified ones.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE PREFERRED EMBODIMENT

The present invention relates to offer a testing method to ascertain that if there is any gooseflesh in a coating illuminated by a polarized light beam.

Figure 1:
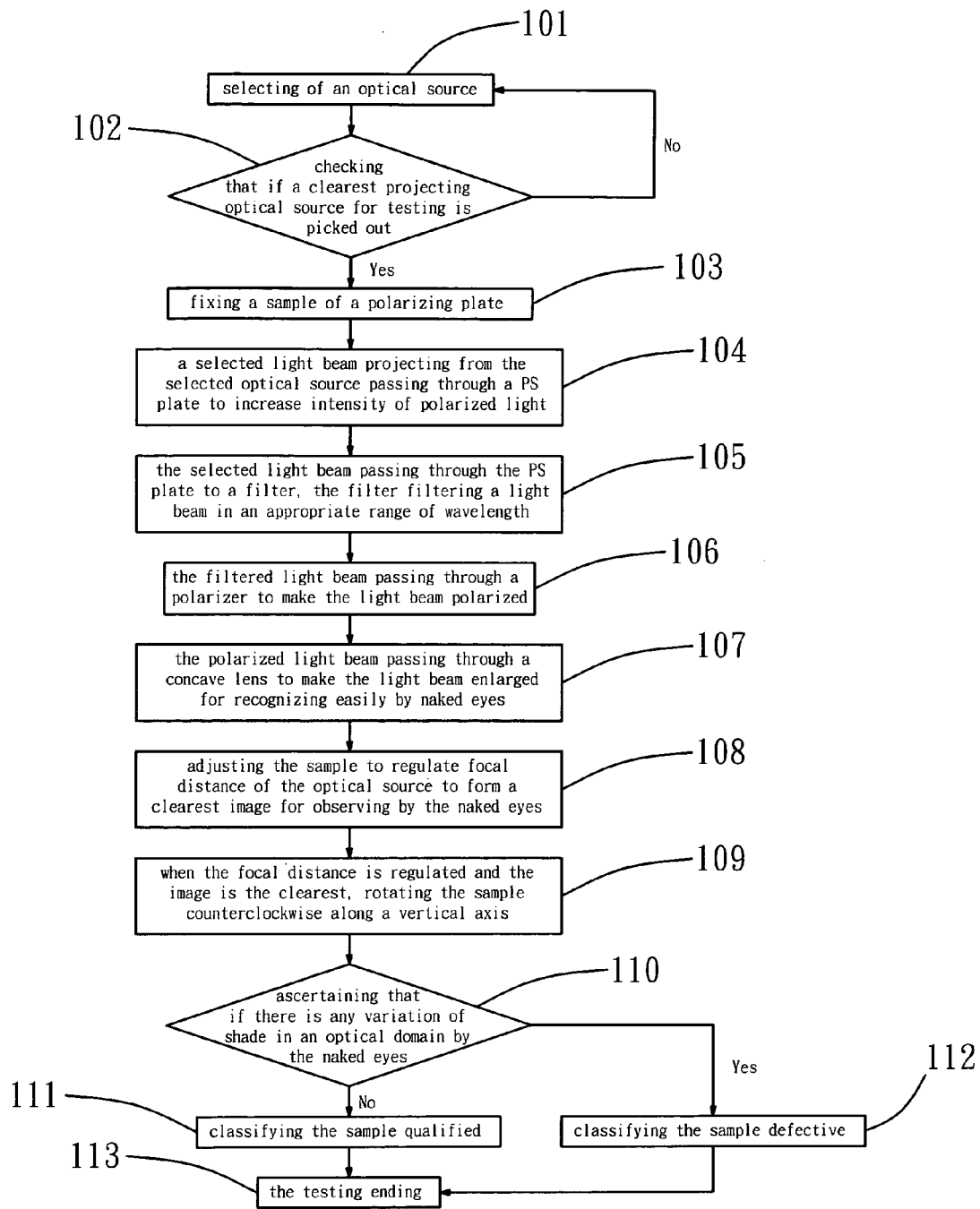
FIG. 1 is testing process of the first preferred embodiment of the present invention.
Figure 3:
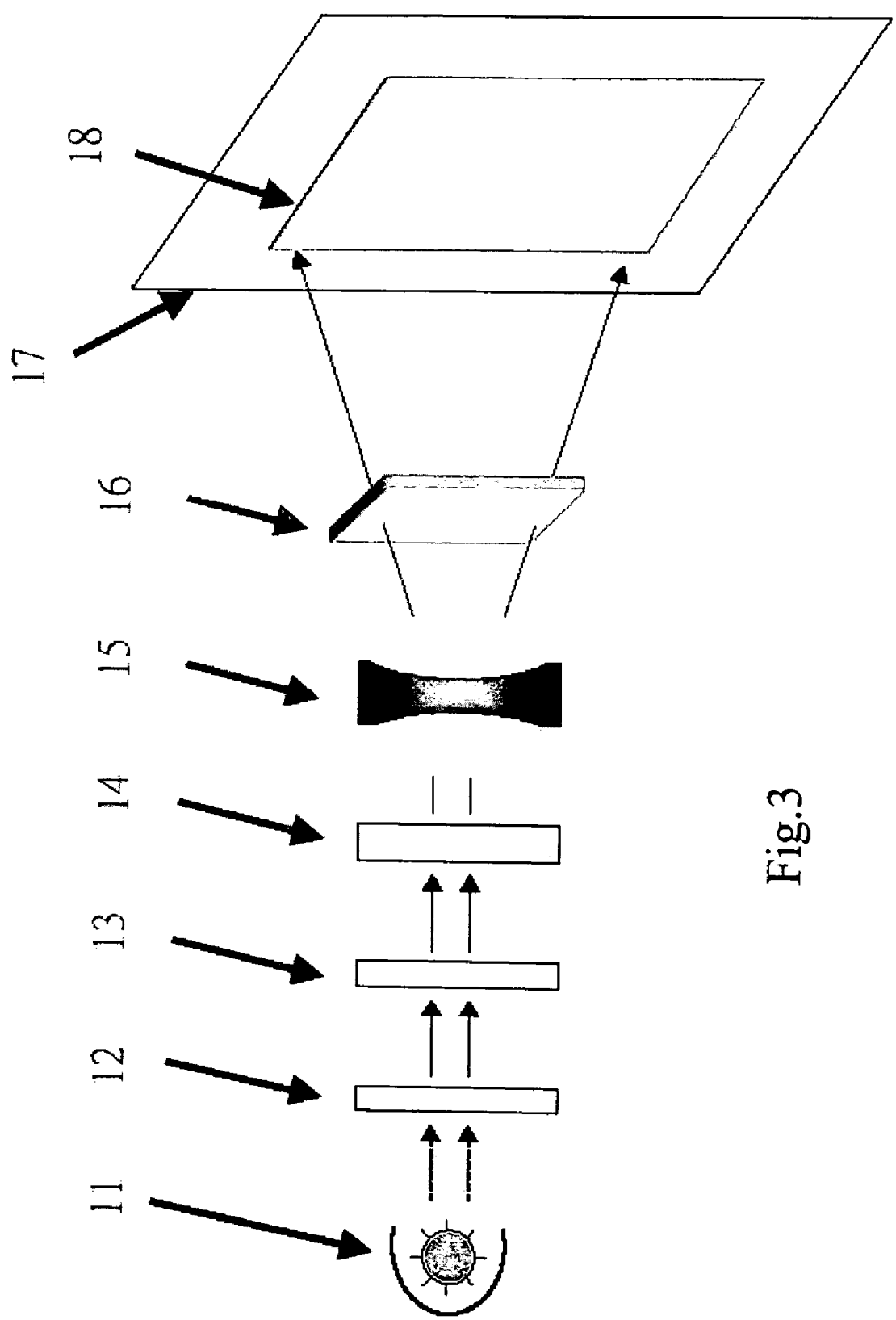
FIG. 3 shows apparatus of the first preferred embodiment of the present invention.

With reference to FIG. 1 and FIG. 3 revealing a testing process and apparatus of the first embodiment. The testing process starts with step 101, selecting of an optical source 11; step 102, checking that if a clearest projecting optical source 11 for testing is picked out, if yes, proceeding to a following step and if not, backing to step 101; step 103, fixing a sample of a polarizing plate 16; step 104, a selected light beam projecting from the selected optical source 11 passing through a PS (polystyrene) plate 12 to increase intensity of polarized light; step 105, the selected light beam passing through the PS plate 12 to a filter 13, the filter 13 filtering a light beam in an appropriate range of wavelength, wherein the range of wavelength includes red, blue and green lights; step 106, the filtered light beam passing through a polarizer 14 to make the light beam polarized; step 107, the polarized light beam passing through a concave lens 15 to make the light beam enlarged for recognizing easily by naked eyes; step 108, adjusting the sample 16 to regulate focal distance of the optical source 11 to form a clearest image for observing by the naked eyes; step 109, when the focal distance is regulated and the image is the clearest, rotating the sample 16 counterclockwise along a vertical axis; step 110, ascertaining that if there is any variation of shade in an optical domain by the naked eyes, wherein each of the sample 16 itself and an image 18 projected on a screen 17 can be observed; if there is no apparent variation of shade, proceeding to the next step 111 and if there is apparent variation, proceeding to step 112; step 111, classifying the sample qualified and proceeding to step 113; step 112, classifying the sample defective; step 113 the testing ending.

Figure 2:
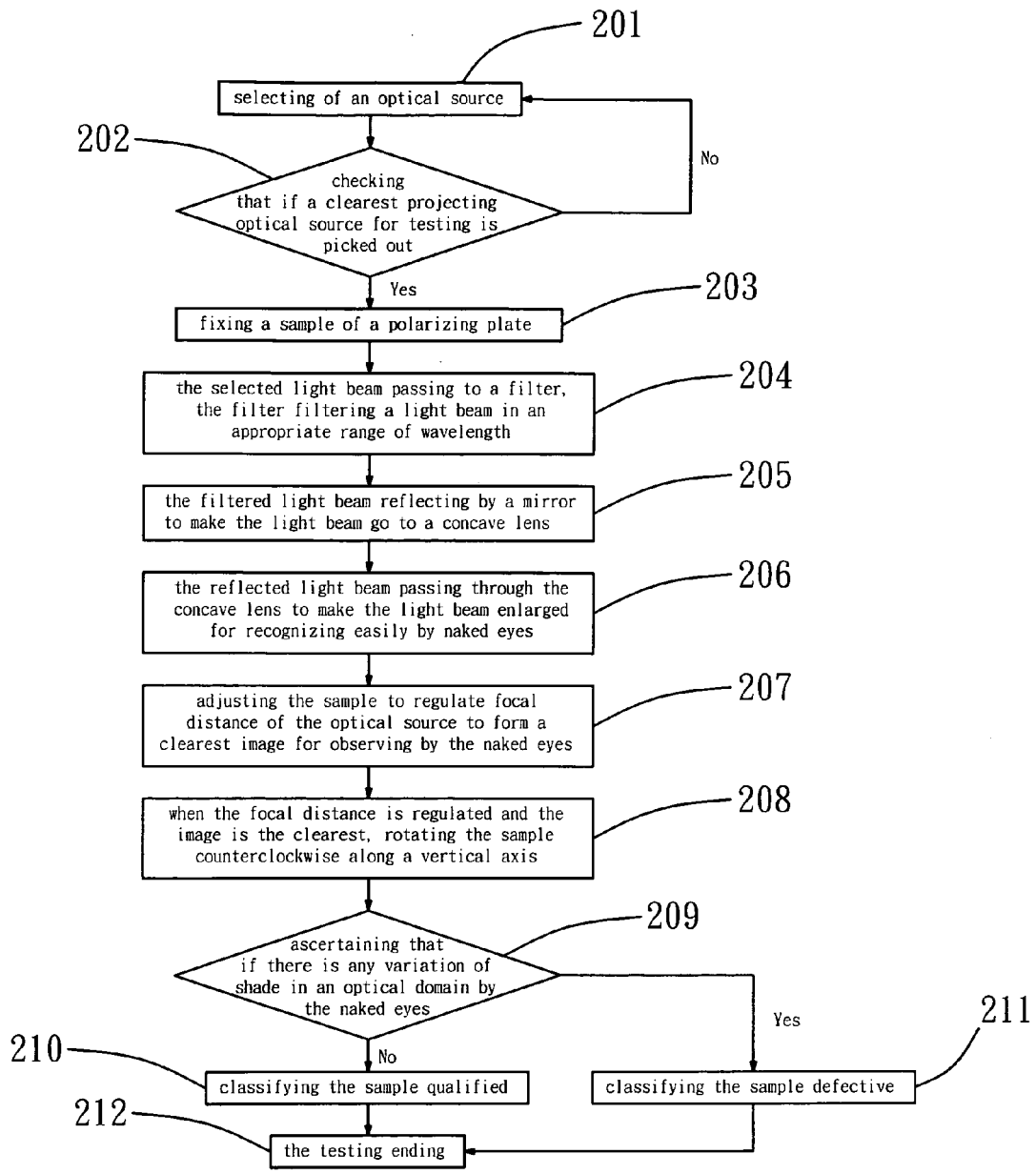
FIG. 2 is testing process of the second preferred embodiment of the present invention.
Figure 4:
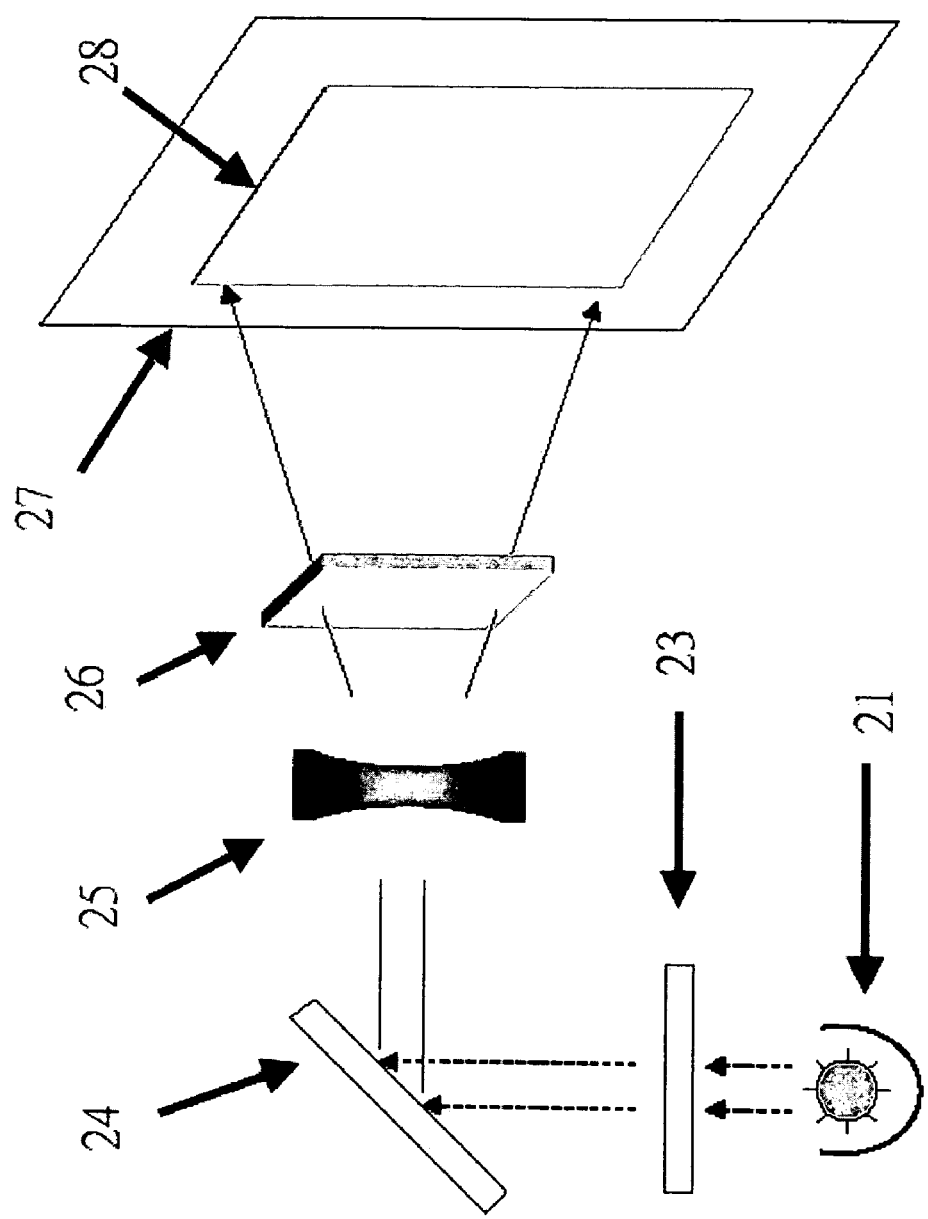
FIG. 4 shows apparatus of the second preferred embodiment of the present invention.

With reference to FIG. 2 and FIG. 4 revealing a testing process and apparatus of the second embodiment. The testing process starts with step 201, selecting of an optical source 21; step 202, checking that if a clearest projecting optical source 21 for testing is picked out, if yes, proceeding to a following step and if not, backing to step 201; step 203, fixing a sample of polarizing plate 26; step 204, the selected light beam passing to a filter 23, the filter 23 filtering a light beam in an appropriate range of wavelength, wherein the range of wavelength includes red, blue and green lights; step 205, the filtered light beam reflecting by a mirror 24 to make the light beam go to a concave lens 25; step 206, the reflected light beam passing through the concave lens 25 to make the light beam enlarged for recognizing easily by naked eyes; step 207, adjusting the sample 26 to regulate focal distance of the optical source 21 to form a clearest image for observing by the naked eyes; step 208, when the focal distance is regulated and the image is the clearest, rotating the sample 26 counterclockwise along a vertical axis; step 209, ascertaining that if there is any variation of shade in an optical domain by the naked eyes, wherein the sample 26 and an image 28 projected on a screen 27 can be observed; if there is no apparent variation of shade, proceeding to the next step 210 and if there is apparent variation, proceeding to step 211; step 210, classifying the sample qualified and proceeding to step 212; step 211, classifying the sample defective; step 212 the testing ending.

The testing method not only checks the non-uniformity of the film thickness, but also ascertains that if there is any defect of scrape and non-uniformly coating. One another advancement of the method is that the test costs is not too much and no expensive instruments need to be set up additionally; moreover, an addition processing of polarizing plate pasting is needless and the sample itself can be checked. Therefore, the testing method has a simplified procedure and it does not take much time to finish the checking.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A testing method for an optical layer of a polarizing plate including steps of:
   selecting an optical source;
   fixing a sample plate with an optical layer to be tested;
   polarizing a light beam from the selected optical source and projecting the polarized light beam through the sample plate, wherein polarizing said light beam is selected from the group consisting of reflection and transmission, and said transmission includes the steps of (a) passing a light beam from the selected source through a filter, (b) passing the filtered light beam through a polarizer, and (c) passing the polarized light beam through a concave lens to diverge the light passing therethrough;
   adjusting a position of the sample plate to focus an image from the sample plate; and
   rotating the sample plate to observe if there is any contrast variation in the image.

2. A testing method for an optical layer of a polarizing plate including steps of:
   selecting an optical source;
   fixing a sample plate with an optical layer to be tested;
   passing a light beam from the selected source through a filter;
   passing the filtered light beam through a polarizer;
   passing the polarized light beam through a concave lens to diverge the light passing therethrough;
   projecting the diverging light beam through the sample plate onto a screen;
   adjusting a position of the sample plate to focus an image on the screen; and
   rotating the sample plate to observe if there is any contrast variation in the image.

3. The testing method according to claim 1, wherein the reflection includes the following steps:
   passing a light beam from the selected source through a filter;
   reflecting the filtered light beam with a mirror;
   passing the reflected light beam through a concave lens to diverge the light passing therethrough.

4. A testing method for an optical layer of a polarizing plate including steps of:
   selecting an optical source;
   fixing a sample plate with a coating to be tested;
   passing a light beam from the selected source through a filter;
   reflecting the filtered light beam with a mirror;
   passing the reflected light beam through a concave lens to diverge the light passing therethrough;
   projecting the diverging light beam through the sample plate onto a screen;
   adjusting a position of the sample plate to focus an image on the screen; and
   rotating the sample plate to observe if there is any contrast variation in the image.

5. The testing method according to claim 1, wherein the optical source includes red, blue and green lights.

* * * * *